United States Patent
Herbold

[11] Patent Number: 5,709,274
[45] Date of Patent: Jan. 20, 1998

[54] CONVERSION HITCH

[76] Inventor: Greg H. Herbold, 1257 Lenox Ave., Pierson, Iowa 51048

[21] Appl. No.: 605,382

[22] Filed: Feb. 22, 1996

[51] Int. Cl.$^6$ ............................................................ B60D 1/14
[52] U.S. Cl. .................... 172/248; 280/494; 280/416.2; 172/439
[58] Field of Search .................... 172/248, 439, 172/450; 280/494, 493, 416.2, 416.1, 415.1; 56/DIG. 14

[56] References Cited

U.S. PATENT DOCUMENTS

| | | | |
|---|---|---|---|
| D. 251,846 | 5/1979 | Martin et al. | D15/28 |
| D. 317,426 | 6/1991 | Lytle | D12/162 |
| D. 341,810 | 11/1993 | Cordia | D12/162 |
| D. 349,875 | 8/1994 | Blodgett | D12/162 |
| 2,321,516 | 6/1943 | Robertson | 280/416.2 X |
| 2,583,191 | 1/1952 | Voorhees | 280/494 |
| 2,594,592 | 4/1952 | Rutter | 280/494 X |
| 3,345,764 | 10/1967 | Malsam | 280/494 X |
| 3,905,619 | 9/1975 | Sylvester | 280/416.2 |
| 4,119,328 | 10/1978 | Rhodes | 280/416.1 |
| 4,272,098 | 6/1981 | Greatbatch | 280/494 |
| 4,427,212 | 1/1984 | Leväaho et al. | 280/511 |
| 4,679,634 | 7/1987 | Bulmahn | 172/250 |
| 4,708,359 | 11/1987 | Davenport | 280/477 |
| 4,832,358 | 5/1989 | Bull | 280/418.1 |
| 4,960,288 | 10/1990 | Chambers | 280/423.1 |
| 5,186,483 | 2/1993 | Sheppard | 280/494 |
| 5,193,625 | 3/1993 | Goll | 172/248 |
| 5,267,747 | 12/1993 | Thorn | 280/416.2 |
| 5,363,924 | 11/1994 | Foley et al. | 172/326 |
| 5,516,140 | 5/1996 | Hinte | 280/494 |

FOREIGN PATENT DOCUMENTS

| | | | |
|---|---|---|---|
| 615463 | 2/1961 | Canada | 280/494 |
| 39811 | 9/1965 | Germany | 280/416.1 |
| 914469 | 1/1963 | United Kingdom | 172/248 |
| 2126960 | 4/1984 | United Kingdom | 280/416.2 |

*Primary Examiner*—Terry Lee Melius
*Assistant Examiner*—Christopher J. Novosad
*Attorney, Agent, or Firm*—Zarley, McKee, Thomte Voorhees & Sease; Dennis L. Thomte

[57] ABSTRACT

A conversion hitch for a farm implement, such as a drill, comprising a connector which is removably secured to the forward end of the implement hitch and which has a first support member extending forwardly therefrom. A second support member is pivotally connected, about vertical and horizontal axes, to the forward end of the first support member and has connectors at the opposite ends thereof which are adapted to be secured to the rearward ends of the lift arms of the two-point hitch of the tractor.

4 Claims, 4 Drawing Sheets

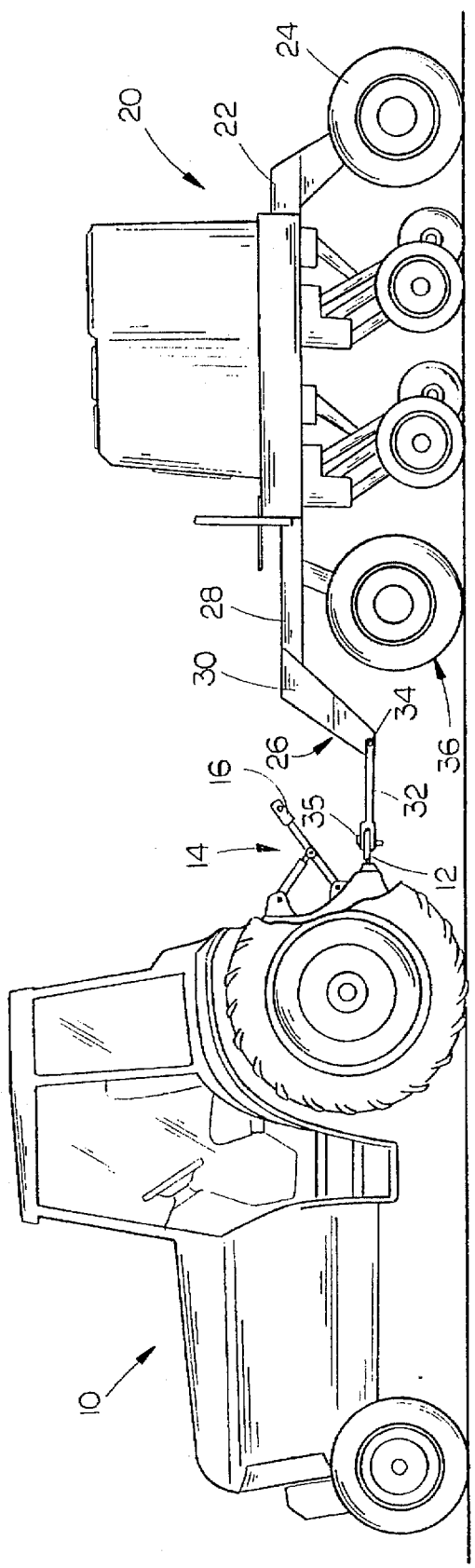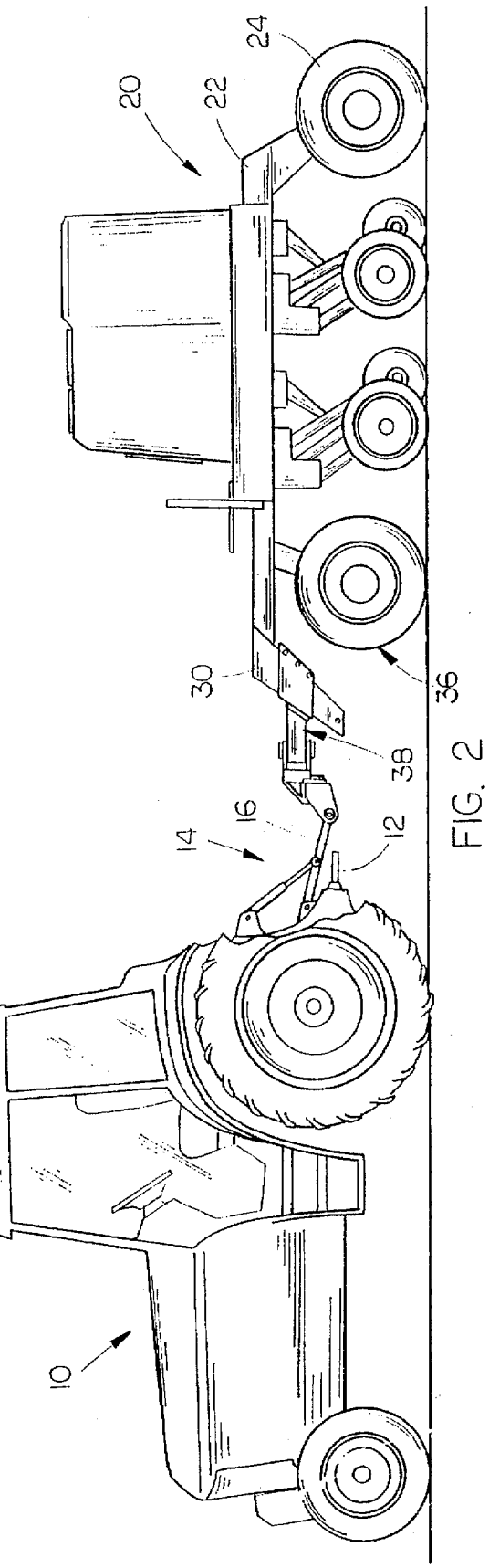

CONVERSION HITCH

BACKGROUND OF THE INVENTION

1. Field of the Invention

This invention relates to a conversion hitch and more particularly to a conversion hitch for a grain drill having a dolly wheel-type hitch at the forward end thereof.

2. Description of the Related Art

Many types of agricultural implements such as a grain drill and, more particularly, a Model 750 John Deere soybean drill, include a frame which is wheel-supported at its rearward end and which has a forwardly extending hitch at its forward end for connection to a prime mover such as a tractor. In the John Deere Model 750 soybean drill, the rearward end of the hitch is rigidly attached to the frame and has a pair of ground engaging dolly wheels which support the same. The hitch also includes a tongue member which is pivotally connected, about a horizontal axis, to the forward end of the rearward hitch portion. The forward end of the tongue member is connected to the drawbar of the tractor. As the grain drill is pulled through a field by the tractor, the dolly wheels support the weight of the forward end of the grain drill and frequently sink into wet soil. A further disadvantage of the dolly wheel-type hitches is that the height of the hitch is normally preset and an adjustment thereof, if possible, is difficult and time-consuming. Further, the turning radius of the tractor and implement is greater than desirable due to the pivotal connection of the forward end of the tongue member to the drawbar of the tractor.

SUMMARY OF THE INVENTION

A conversion hitch for a grain drill or the like is disclosed. The grain drill includes a frame having forward and rearward ends, with the rearward end of the frame being supported by ground engaging wheels. The grain drill is provided with a dolly wheel hitch including a rear hitch portion which is rigidly secured to the frame and which extends forwardly therefrom. An intermediate hitch portion is rigidly secured to the forward end of the rear hitch portion and extends downwardly and forwardly therefrom. A tongue having a rearward end is removably pivotally secured, about a horizontal axis, to the forward end of the intermediate hitch portion and extends forwardly therefrom for normal connection to a tractor drawbar. The conversion hitch of this invention comprises a connector member having a connector clamp at its rearward end for removable connection to the intermediate hitch portion between the upper and lower ends thereof and a forwardly extending first support member. A horizontally disposed, elongated second support member having its longitudinal axis disposed transversely to the normal direction of travel of the grain drill is pivotally secured, about a vertical axis, to the forwardly extending first support member. The opposite ends of the second support member have means thereon for removable connection to a pair of vertically moving hitch members on the tractor, after the tongue has been removed from the intermediate hitch portion. The vertical movable hitch members of the tractor may be moved vertically upwardly so as to transfer the weight from the dolly wheels to the tractor hitch. When it is desired to pull the grain drill along a highway or the like with the use of a truck or the like, the tongue member may be reinstalled on the hitch of the grain drill.

It is therefore a principal object of the invention to provide an improved conversion hitch for a farm implement.

A further object of the invention is to provide an improved conversion hitch for a grain drill or the like having a dolly wheel hitch at the forward end thereof.

Yet another object of the invention is to provide a conversion hitch for attachment to a dolly wheel hitch so that the weight may be transferred from the dolly wheels to the tractor hitch.

Yet another object of the invention is to provide a conversion hitch which results in the tractor and implement having a smaller turning radius.

Still another object of the invention is to provide a conversion hitch for a dolly wheel grain drill which enables the grain drill to be pulled through rough areas in a smoother fashion due to the fact that the larger rear wheels of the tractor roll over ruts much better than do the dolly wheels.

Yet another object of the invention is to provide a conversion hitch which is easily installed on a farm implement such as a dolly wheel-type grain drill.

These and other objects will be apparent to those skilled in the art.

BRIEF DESCRIPTION OF THE DRAWINGS

FIG. 1 is a side view of a conventional tractor pulling a prior art grain drill;

FIG. 2 is a side view similar to FIG. 1 except that the conversion hitch of this invention has been installed on the grain drill;

DESCRIPTION OF THE PREFERRED EMBODIMENT

Figure 3:
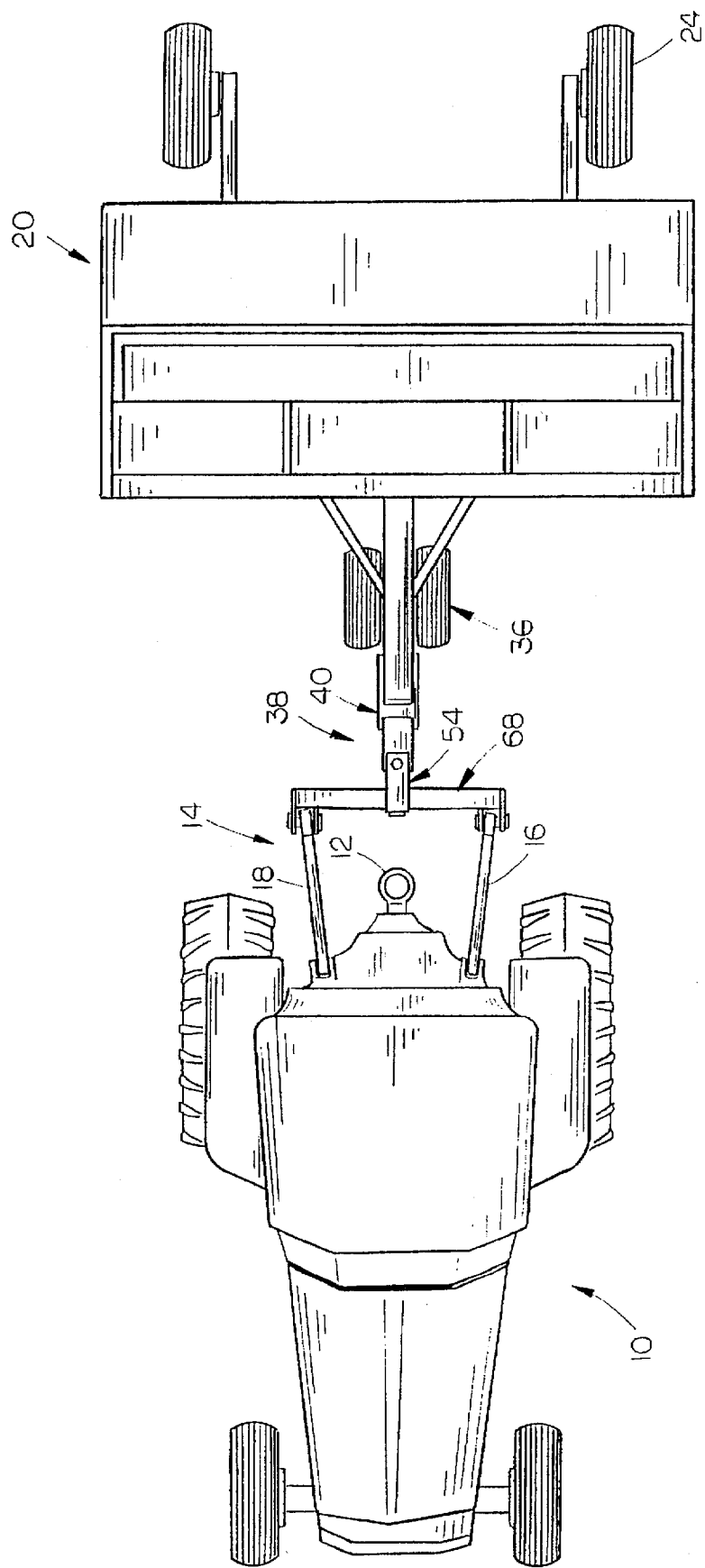
FIG. 3 is a top view of the tractor and drill of FIG. 2.

In FIGS. 1–3, the numeral 10 refers to a conventional tractor having a drawbar 12 and a two-point hitch 14 including lift arms 16 and 18. The numeral 20 refers to a farm implement such as a drill. The conversion hitch of this invention, which will be described in more detail hereinafter, is ideally suited for use with a John Deere Model 750 soybean drill. Drill 20 includes a main frame 22 having wheels 24 positioned at the rearward end thereof for supporting the rearward end of the drill. A hitch 26 is provided at the forward end of the drill 20 and includes a rear hitch portion 28 which is rigidly connected to main frame 22 and which extends forwardly therefrom. Intermediate hitch portion 30 is rigidly connected to the forward end of rear hitch portion 28 and extends downwardly and forwardly therefrom, as seen in the drawings. Normally, a tongue member or tongue 32 is provided at the forward end of the hitch 26 and has its rearward end pivotally connected, about a horizontal axis, to the lower forward end of intermediate hitch portion 30 by means of pin or bolt 34. Normally, the forward end of the tongue member 32 is connected to the rearward end of the drawbar 12 by means of a conventional hitch pin 35. The weight of the forward end of the drill 20 is supported by the dolly wheel assembly 36 in conventional fashion.

In use, the dolly wheels of the dolly wheel assembly 36 tend to sink into wet soil. It is also difficult to pull the grain drill through rough areas due to the fact that the dolly wheels tend to bounce up and down. Further, none of the weight of the drill 20 is transferred to the drawbar 12 due to the pivotal connection between the tongue member 32 and the intermediate hitch portion 30.

In an effort to eliminate the disadvantages of the hitch arrangement of the drill 20, a conversion hitch 38 has been provided. Conversion hitch 38 includes a connector member 40 which is in the form of a clamp member having a front portion 42 and opposite side walls 44 and 46 having a plurality of openings 48 formed therein. Connector member 40 is mounted on the intermediate hitch portion 30 by means of bolts 49 extending through the registering openings 48 on the side walls 44 and 46. A first support member 50 is secured to front wall 42 of connector member 40 and extends forwardly therefrom. The forward end of first support member 50 is provided with an opening 52 extending therethrough in a vertical fashion.

The numeral 54 refers to a joint including a pair of rearwardly extending bars 56 and 58 having registering openings formed therein adapted to receive pin 60 extending therethrough and through opening 52 in first support member 50 to provide a pivotal connection, about a vertical axis, between joint 54 and the first support member 50. Joint 54 also includes a pair of spaced-apart bars 62 and 64 provided therein at its forward end and which have registering openings 63 and 65 formed therein, respectively, adapted to receive a pin 66 therethrough.

The numeral 68 refers to a second support member including a transversely extending frame 70 having opposite ends and having a horizontally disposed opening 72 extending therethrough at the center length thereof. Opening 72 is adapted to receive the pin 66 extending therethrough to provide a pivotal connection, about a horizontal axis, between second support member 68 and joint 58. Second support member 68 includes a pair of connector plates 74 and 76 provided at one end thereof and a pair of connector plates 78 and 80 provided at the other end thereof which are adapted to be removably connected to the rearward ends of the lift arms 16 and 18 by means of pins 82 and 84, respectively, which extend through openings 86–88 and 90–92, respectively.

Figure 4:
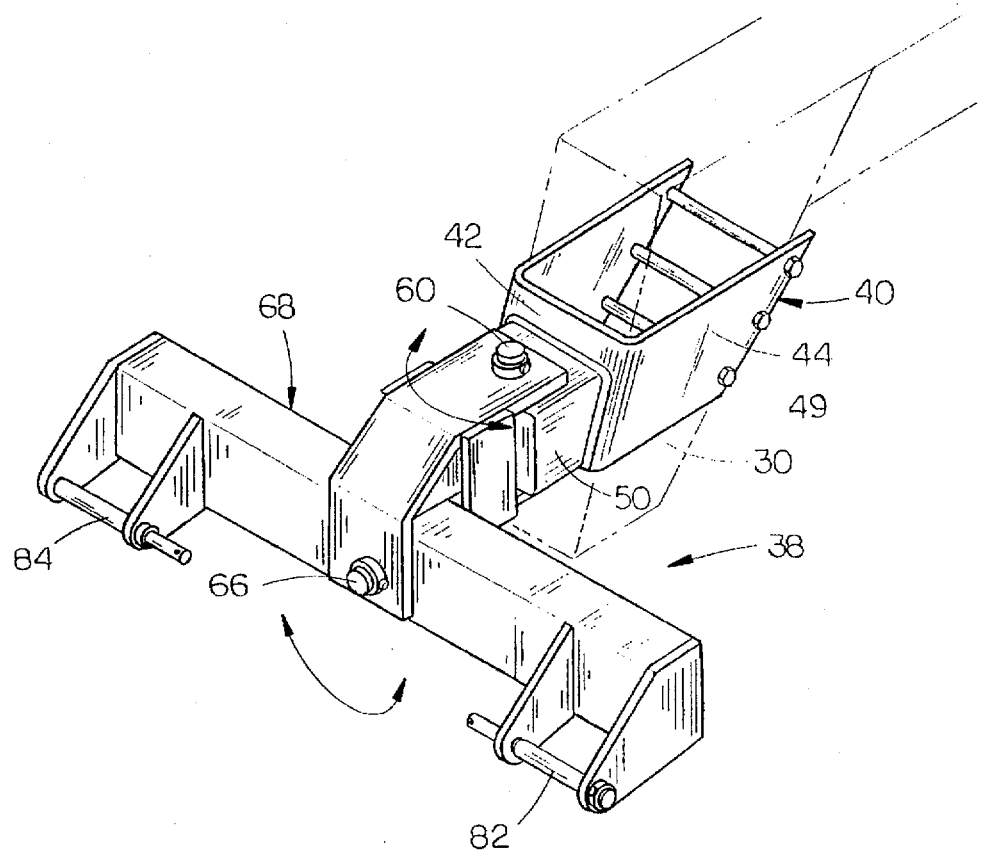
FIG. 4 is a front perspective view of the conversion hitch of this invention.
Figure 5:
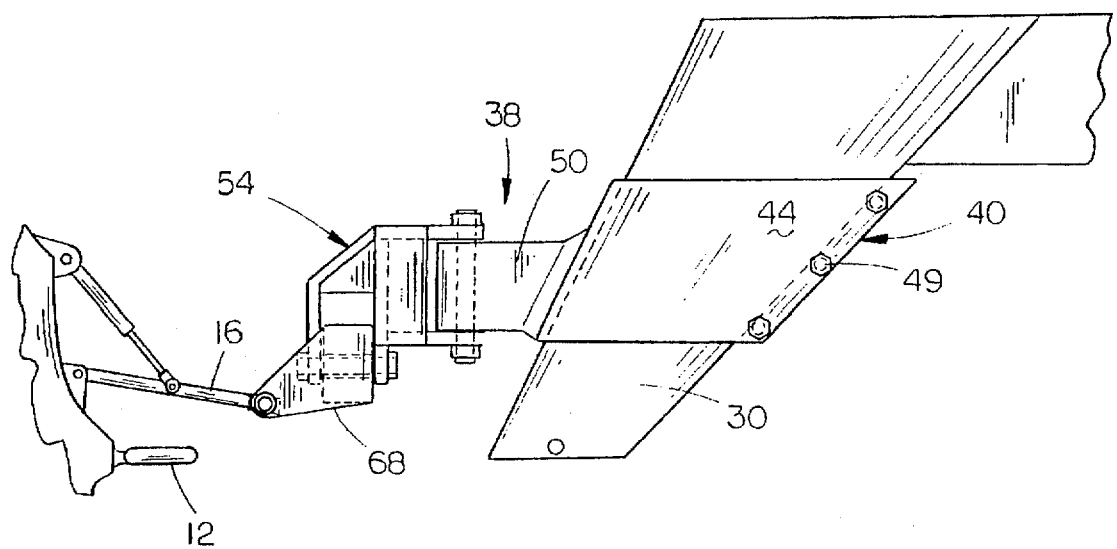
FIG. 5 is a side elevational view of the conversion hitch of this invention.
Figure 6:
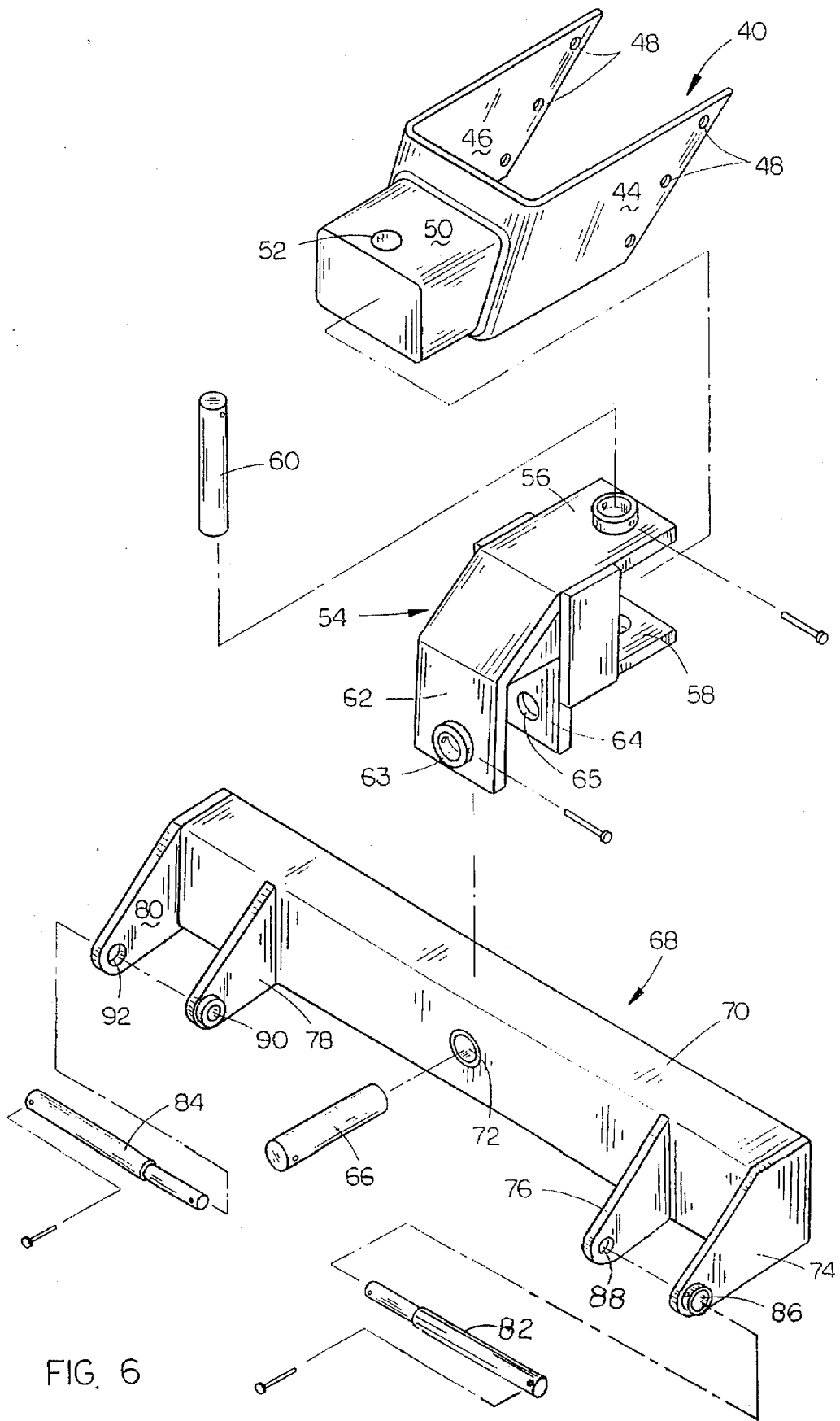
FIG. 6 is an exploded perspective view of the conversion hitch of this invention.

Assuming that the hitch 26 on the drill 20 is to be convened, the tongue member 32 is detached from the lower forward end of the intermediate hitch portion 30 by removing the pin 34. Connector member 40 is then mounted on the intermediate hitch portion 30, as seen in FIGS. 4 and 5. If the second support member 68 has not been previously connected to the joint 54, the support member 68 is then secured to the joint 54 by means of the pin 66, as previously described. The connector plates 74–76 and 78–80 are then connected to the lift arms 16 and 18 of the two-point hitch 14 by means of pins 82 and 84, respectively. In operation, the weight on the front dolly wheels of the dolly wheel assembly 36 may be adjusted to meet field conditions by simply raising or lowering the two-point hitch 14 of the tractor which will prevent the wheels from sinking into wet soil. For example, if the two-point hitch 14 is raised, less weight will be imposed on the dolly wheel assembly 36 and more weight will be transferred to the tractor through the two-point hitch 14. The weight transfer capability can also assist in better traction control for the tractor, especially in hilly terrain. The grain drill 20 is able to be pulled through rough areas in a smoother fashion, since the larger rear wheels of the tractor roll over ruts much better than do the smaller wheels of the dolly wheel assembly 36. It is also easier to turn the drill in a sharper fashion due to the extra room provided by the pivot action of the hitch.

If it is desired to pull the drill over the road to a different field location behind a truck or other tractor, the tongue member 32 is reinstalled with the single pivot pin 34. The conversion hitch 26 may remain attached to the drill for this operation.

Thus it can be seen that a novel conversion hitch has been provided which accomplishes at least all of its stated objectives.

I claim:

1. In combination:

a tractor having a two-point hitch including a pair of selectively vertically movable lift arms;

a grain drill having a frame including forward and rearward ends, said frame being supported by ground engaging wheels at the rearward end thereof, a dolly wheel hitch including a rear hitch portion which is rigidly secured to said frame and which extends forwardly therefrom, an intermediate hitch portion which is rigidly secured to the forward end of said rear hitch portion which extends downwardly and forwardly therefrom; said intermediate hitch portion including upper and lower ends;

a conversion hitch for attachment to said grain drill to enable said grain drill to be connected to said two-point hitch of said tractor;

said conversion hitch comprising a connector member having a rearward end removably connected between to said intermediate hitch portion between the upper and lower ends thereof; said connector member including a forwardly extending first support member having a forward end; a horizontally disposed, elongated second support member having its longitudinal axis disposed transversely to the normal direction of travel of the grain drill, said second support member being operatively pivotally secured, about vertical and horizontal axes, to said first support member; means selectively vertically connecting said connector member said intermediate hitch portion; said second support member having first and second ends having means thereon for removable connection to said lift arms of said two-point hitch whereby said lift arms may be selectively vertically moved to vertically move said intermediate hitch portion of said grain drill.

2. The combination of claim 1 wherein a joint means pivotally interconnects, about horizontal and vertical axes, said first support member and said second support member.

3. The combination of claim 1 wherein said connector member comprises a clamp which is removably clamped onto said intermediate hitch portion.

4. In combination with a tractor having a two-point hitch including a pair of selectively vertically movable lift arms; a grain drill having a frame including forward and rearward ends, said frame being supported by ground engaging wheels at the rearward end thereof, a dolly wheel hitch including a rear hitch portion which is rigidly secured to said frame and which extends forwardly therefrom, an intermediate hitch portion which is rigidly secured to the forward end of said rear hitch portion which extends downwardly and forwardly therefrom, said intermediate hitch portion including upper and rearward ends:

a conversion hitch for attachment to said grain drill to enable said grain drill to be connected to said two-point hitch of said tractor;

said conversion hitch comprising a connector member having a rearward end for removable connection to said intermediate hitch portion between the upper and lower ends thereof; said connector member including a forwardly extending first support member having a forward end; a horizontally disposed, elongated second support member having its longitudinal axis disposed transversely to the normal direction of travel of the grain drill, said second support member being operatively pivotally secured, about vertical and horizontal axes, to said first support member; means selectively vertically connecting said connector member to said intermediate hitch portion; said second support member having first and second ends having means thereon for removable connection to said lift arms of said two-point hitch whereby said lift arms may be selectively vertically moved to vertically move said intermediate hitch portion of said grain drill.

* * * * *